United States Patent Office 3,321,323
Patented May 23, 1967

3,321,323
DEGREE OF DIRECT BONDING IN BRICK OF MAGNESIA AND CHROME ORE
Ben Davies, Pittsburgh, Pa., assignor to Harbison-Walker Refractories Company, Pittsburgh, Pa., a corporation of Pennsylvania
No Drawing. Filed Jan. 27, 1966, Ser. No. 523,281
3 Claims. (Cl. 106—59)

ABSTRACT OF THE DISCLOSURE

A method of promoting the direct bonding between magnesia and chrome ore in burned brick of the direct bonded type by maintaining the $SiO_2$ between 1.2 and 2% and the $B_2O_3$ content between 0.1 and 0.25%.

---

This invention relates to improvements in direct bonded brick of the type, for example, disclosed and claimed in United States Patents 3,180,743, and 3,180,744, of myself and Frank H. Walther which are brick of chrome ore and magnesia ranging from 20 to 60% chrome ore and 80 to 40% magnesia.

The type of brick currently being referred to as "direct bonded" brick, from one manufacturer to another and from brick of one brick batch to another brick batch, vary in degree or quantity of so-called "direct bonds" between particulate chrome ore and dead burned magnesia constituents.

In a given "direct bonded" brick, there is some so-called silicate bonding (in which a predominantly basic silicate phase "glues" together adjacent chrome ore and periclase particles), there are some cracks, voids, or spaces between adjacent mineralogically dissimilar particles, and there are also those desired areas of direct attachment. Thus, in a representative sample, as viewed under the microscope, a skilled mineralogist can actually count the various types of bonds (or lack of bonds) and arrive at statistically significant quantitative indications of the degree of direct bonding in a given sample or samples.

A number of parameters must receive close attention if one wishes to obtain a high degree of direct bonding in a brick. These parameters which are related to the reaction and diffusion of chrome ore into the magnesite and intimacy of contact between chrome ore and magnesite include porosity of brick, grain sizing of ingredients, firing temperature and purity of ingredients. In particular, the quantity of silica ($SiO_2$) present should be maintained below about 2% total in the brick to obtain the most satisfactory direct bonding. I have now discovered that there is a second constituent, the control of which is as critical as the control of the $SiO_2$ content if one wishes to promote the formation of those desired areas of direct attachment between chrome ore and dead burned magnesite constituents. This other constituent is boron oxide.

Of course, it is desired that the quantity of the areas of direct attachment be high, since such engenders high-temperature strength and it is the primary object of this invention to promote, or increase, the quantity of areas of direct attachment.

Briefly, according to one embodiment, there is provided a method of promoting the formation of direct bonds in fired brick of chrome ore and magnesia, which comprises maintaining (on an oxide basis) a $SiO_2$ content between about 1.3 and about 2.0% and a $B_2O_3$ content between about 0.1 and about 0.25%. Note that, contrary to prior teachings, there must be at least some $SiO_2$ present, i.e., previously it has been thought that very substantial reduction approaching elimination of $SiO_2$ would be the best way to promote more extensive formation of direct bonds. To a degree, this is correct. However, I have discovered that when the $SiO_2$ is much less than about 1.3% $SiO_2$, there is a decrease in high-temperature strength of the brick due to less areas of direct attachment between chrome ore and magnesia constituents. In a series of laboratory expriments, I studied the effect of boric acid on the amount of direct bonding of burned magnesite chrome ore brick. Table I reports the batches used in the preparation of these brick and the results of testing. Mix A contained no added boron, but the other mixes contained increasing amounts.

The relative chrome ore bonding is a measure of the amount of direct bonding. This measure is obtained by first preparing a polished section. The section is then placed under a microscope for examination. The type of bonding on each side of all chrome ore grains larger than 75 microns located along randomly placed lines is counted until 300 counts are obtained. The results are reported as percentages of direct bonding and silicate bonding and no bonding.

TABLE I

|  | Mix Number (percent) | | | |
|---|---|---|---|---|
|  | A | B | D | F |
| Mix: | | | | |
| Chrome Ore | 6 | 6 | 6 | 6 |
| —14+28 mesh | 24 | 24 | 24 | 24 |
| —28 mesh | | | | |
| Magnesite: | | | | |
| —4+8 mesh | 30 | 30 | 30 | 30 |
| —8+28 mesh | 10 | 10 | 10 | 10 |
| Ball Mill Fines (All —65 and 40 to 60% —325 mesh) | 30 | 30 | 30 | 30 |
| Tempering Fluid | 4.5 | 4.5 | 4.5 | 4.5 |
| Boric Acid | 0.0 | 0.2 | 0.6 | 1.0 |
| Relative Chrome Ore Bonding Measured by Microscopic Scanning: | | | | |
| A. Direct bonding | 18 | 25 | 31 | 44 |
| B. Silicate bonding | 7 | 10 | 11 | 12 |
| C. No bond | 75 | 65 | 58 | 44 |
| Chemical Analysis of Fired Shape: | | | | |
| Silica ($SiO_2$) | 1.3 | 1.2 | 1.1 | 1.2 |
| Alumina ($Al_2O_3$) | 8.7 | 9.0 | 9.3 | 9.7 |
| Titania ($TiO_2$) | 0.1 | 0.1 | 0.1 | 0.1 |
| Iron Oxide ($Fe_2O_3$) | 4.9 | 4.9 | 5.0 | 5.0 |
| Chromic Oxide ($Cr_2O_3$) | 9.0 | 10.0 | 10.3 | 10.6 |
| Lime (CaO) | 1.0 | 1.0 | 1.0 | 1.0 |
| Boron Oxide ($B_2O_3$) | 0.065 | 0.12 | 0.20 | 0.26 |

All mixes, having been made of the same chrome ore and magnesite, in the same proportions, the percentage of silica shown by analysis should be the same for all mixes; the results ranging from 1.1 to 1.3% should probably be considered equivalent within the limits of material variation and the accuracy of batching methods and analytical procedures.

These brick were made with a close control on the grain size of the ingredients and burned to a high temperature, but were intentionally made with an apparent porosity of about 20%. This porosity is normally too high to give a large percentage of direct bonding between chrome ore and magnesite, but affords an opportunity to measure the effectiveness of boron oxide to increase direct bonding. Much higher degrees of direct bonding are obtainable by making more conventional brick of much less porosity.

As the data in Table I clearly indicate, as the quantity of boron oxide is increased in these magnesia-chrome brick having 1.1 to 1.3% of $SiO_2$, the amount of direct bonding markedly increases. In mix A, the 0.065% boron oxide was the residue of that occurring naturally in the raw materials used to make the brick. In mix F, 1% boric acid had been added to the batch, thereby providing 0.26% boron oxide in the fired brick. These two mixes gave the extremes in direct bonding, being 18% when no boric acid was added, and 44% when $B_2O_3$ was built up to 0.26%.

Subsequent research work has established that for the best direct bonding the silica ($SiO_2$) content of the total brick should be between about 1.2 and 2.0, and is preferably between 1.3 and 2.0%. The boron oxide content in the fired brick should be over 0.1%. Preferably, it is maintained between about 0.15 and 0.25. In any event, the essence of the present invention is the control of boron oxide and silica to obtain a maximum of direct bonding in a brick of a mixture of chrome ore and magnesia.

Precisely why the controlled mixture of boron oxide and silica in such small amounts can so affect direct bonding is not fully understood. However, I offer the following as a possible explanation. In firing of the direct bonded brick, the silica, along with other oxides in the brick, react to form a fluid. Thus, one keeps it to a controlled minimum. However, some silica (present as liquid silicates at firing temperatures) is advisable since it reacts with the chrome mineral and promotes diffusion of its oxides throughout the brick, which appears to be a basic requirement if a direct bond is to be affected. Chrome particles are particularly susceptible to attack on solution by molten fluids containing boron oxide. For example, lithium tetraborate is commonly used in spectrographic analysis to completely dissolve chrome ore into a glass.

If this is in fact the role the boron oxide plays then it is surprising and unexpected that such a small quantity of it causes the results it does. There is a tendency of the silicates to collect in pools formed between particles rather than coating the surfaces of adjacent particles. This tendency may be a function of surface tension, i.e., the more mobile and less viscous boron oxide-silica system is more easily penetrated by adjacent particles of chrome ore and magnesia, thus forcing it into pockets.

In Table II, there is provided the chemical analyses of the chrome ore and magnesite used to make the brick of Table I.

TABLE II.—CHEMICAL ANALYSIS

| | Chrome Ore, percent | Magnesite, percent |
|---|---|---|
| Silica ($SiO_2$) | 2.4 | 0.7 |
| Alumina ($Al_2O_3$) | 33.4 | 0.3 |
| Iron Oxide ($Fe_2O_3$) | | 0.3 |
| Iron Oxide (FeO) | 11.2 | |
| Chromic Oxide ($Cr_2O_3$) | 35.0 | |
| Lime (CaO) | 0.3 | 0.9 |
| Magnesia (MgO) | 17.1 | 97.5 |
| Boric Oxide ($B_2O_3$) | | 0.10 |
| Loss on Ignition | | 0.1 |

In my testing, I added the boron oxide to the brick batch as boric acid. It is, of course, understood that the boron oxide may be added in many other forms and as any one of a variety of different types of acids. For example, it can be orth-, meta-, pyro-, tetra-, or peraboric acid, salts of the foregoing such as sodium, potassium, lithium and ammonium borate, or acid borate, calcium, magnesium borates, etc. Organic borates are equally usable as are mixtures of any of the foregoing.

The precise quantity of the boron compound to be added cannot, with great specificity, be defined, since it will vary depending on the compound chosen as the source, the nature of the magnesite and chrome ore used to make the brick, firing temperature, and method of firing (firing can cause volatilization of certain boron oxide compounds). As noted above, the essence of my discovery is the control and balance of silica and boron in a direct bonded brick mix to promote the formation of direct bonds.

I have found a more desirable way to place the boron in the mix is to place it in the dead burned magnesia grain which is used. For example, in comparative testing I used a magnesite which included a minor amount of boron. In comparative tests, a standard made according to the same techniques as the brick of Table I and having my desired control of silica and boron oxide had a modulus of rupture at 2300° F. of 1000 p.s.i. In a comparative brick, I changed the magnesite in the ball mill fines to one having increased boron in it and made a brick of substantially the same chemical analyses as the standard. This brick had a modulus of rupture of 1400 p.s.i. at 2300° F. In still another comparative test, all the magnesite was of the type including the increased boron. It had a modulus of rupture of 1800 p.s.i. at 2300° F. Because of change in the type of magnesia, it was difficult to obtain precisely the same boron content for the three bricks, but I believe the data significant since the desired control of boron oxide and silica was correct and the amazing increase in high temperature strength was obtained.

Having thus described the invention in detail and with sufficient particularity as to enable those skilled in the art to practice it, what is desired to have protected by Letters Patent is set forth in the following claims.

I claim:
1. In methods of the manufacture of fired, direct bonded brick from size graded mixtures of about 20 to 60% chrome ore and 80 to 40% magnesia, the improvement comprising controlling the chemical makeup of the size graded mixture of chrome ore and magnesia so that in the fired brick the silica content expressed as $SiO_2$ is between about 1.2 and 2% of the total brick and the boron expressed as $B_2O_3$ is between about 0.1 and 0.25% of the total brick.

2. The method of claim 1, in which the boron is added to a batch from which the fired brick is made in the form of a compound of boron selected from the group consisting of orthoboric, metaboric, pyroboric, tetraboric and peraboric acids, alkali metal and alkaline earth metal and ammonium salts of the foregoing and acid salts of said alkali metal and alkaline earth metal and ammonium salts, and organic boron compounds yielding boron at the temperature at which said brick is fired.

3. A fired, direct bonded brick of 80 to 40% magnesia and chrome ore 20 to 60% and having a $B_2O_3$ content between 0.1 and 0.25% and an $SiO_2$ content between 1.1 and 2.0%, by weight on an oxide basis.

References Cited by the Examiner

UNITED STATES PATENTS

| | | | |
|---|---|---|---|
| 2,999,759 | 9/1961 | Heuer | 106—59 |
| 3,180,744 | 4/1965 | Davies et al. | 106—59 |
| 3,194,672 | 7/1965 | Davies et al. | 106—59 |
| 3,199,994 | 8/1965 | Davies | 106—59 |

TOBIAS E. LEVOW, *Primary Examiner.*

J. E. POER, *Assistant Examiner.*